United States Patent [19]
Markey

[11] 3,922,742
[45] Dec. 2, 1975

[54] METHOD OF MAKING A LAMINATED NUT AND CLIP

[75] Inventor: Robert Harvey Markey, Warren, Mich.

[73] Assignee: Multifastener Corporation, Detroit, Mich.

[22] Filed: Aug. 15, 1974

[21] Appl. No.: 497,814

[52] U.S. Cl. ............................................... 10/86 R
[51] Int. Cl.² ............................................. B21D 53/24
[58] Field of Search .... 10/86 R, 86 A, 86 CL, 86 F, 10/72 R; 85/32 R, 32 V; 151/21 R, 21 C, 41.75

[56]        References Cited
            UNITED STATES PATENTS

| | | | |
|---|---|---|---|
| 1,516,721 | 11/1924 | Emery | 10/86 A |
| 2,090,125 | 8/1937 | Hower | 10/86 R |
| 2,228,584 | 1/1941 | Place | 151/41.75 |
| 2,381,176 | 8/1945 | Misfeldt | 151/21 R |
| 3,362,278 | 1/1968 | Munse | 151/41.75 |
| 3,365,997 | 1/1968 | Price | 10/86 R |

FOREIGN PATENTS OR APPLICATIONS

| | | | |
|---|---|---|---|
| 10,867 | 5/1902 | United Kingdom | 151/21 R |
| 28,697 | 12/1903 | United Kingdom | 151/21 C |

*Primary Examiner*—C. W. Lanham
*Assistant Examiner*—E. M. Combs
*Attorney, Agent, or Firm*—Cullen, Settle, Sloman & Cantor

[57]            ABSTRACT

A method of making a laminated nut or nut clip having a threaded bore. The lamina may be formed by spirally rolling the end of a strip, flattening the spiral roll, piercing the lamina and forming the threaded bore. The threaded bore is formed by piercing the lamina through one face and then extruding an integral barrel through the pierced hole from the opposite face of the lamina. The barrel is then defined by a plurality of nested cone-shaped portions formed in the lamina in the extrusion step.

11 Claims, 13 Drawing Figures

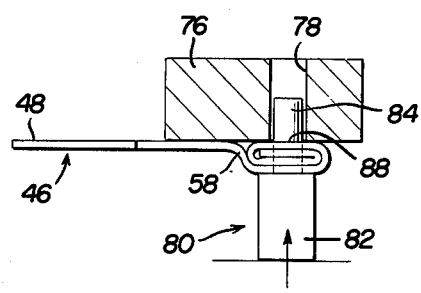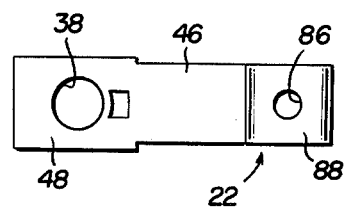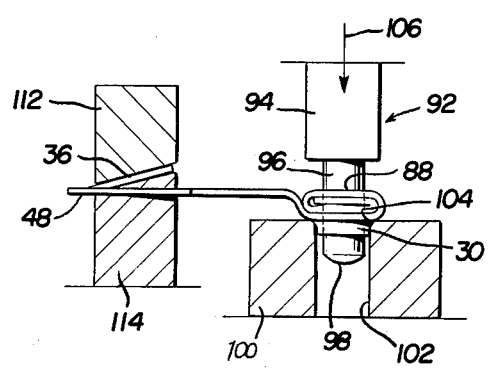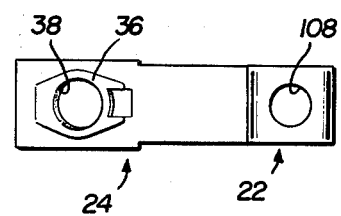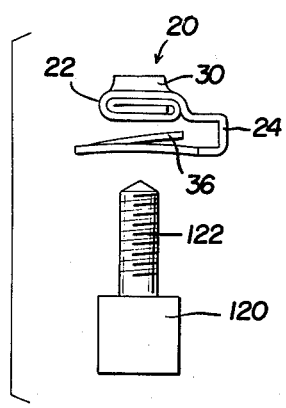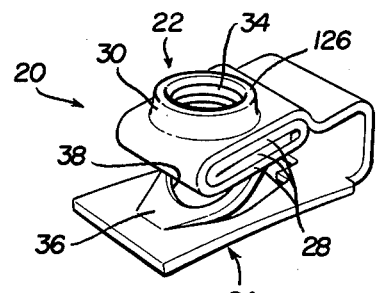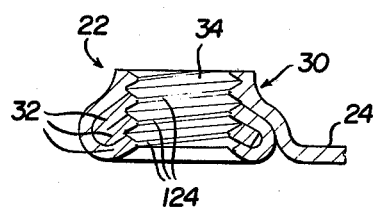

3,922,742

METHOD OF MAKING A LAMINATED NUT AND CLIP

FIELD OF THE INVENTION

A method of forming a nut or nut clip having a plurality of laminations, as distinguished from a solid or integral nut. The nut and nut clip of this invention may be formed from a continuous strip.

The prior art has suggested that nuts and nut clips may be formed from a folded metal strip. For example, U.S. Pat. Nos. 2,224,823 and 2,343,947 disclose nut like elements which are formed from a continuous strip. Similarly, U.S. Pat. Nos. 2,228,584, 3,123,880 and Reissue No. 21,769 disclose nut clips having one or more spaced convolutions. A nut clip is generally utilized to secure a panel or other structural member to a second structural member in generally face-to-face relation. The present commercial nut clips include a U-shaped clip and a conventional nut secured at one end of the clip. The nut may be welded or staked to the clip, such as shown in U.S. Pat. No. 3,091,272.

The folded strip nuts and nut clips suggested by the prior art have not successfully replaced the solid nut or staked nut clip because the nut or nut portion does not meet the performance requirements for solid nuts, particularly pull-out strength. It has not been possible to form a continuous female thread in the nut bore because the folds spread during tapping. Further, tapping chips are trapped between the folds of the nut or nut clip, prematurely wearing the tapping tool. The prior art avoids this problem by purposely spacing the folds of the nut, using the edge of each fold as a female thread crest. This is however a weak structure because the pull-out strength is essentially limited to the strength of one fold. On pull-out, a "guillotine" effect occurs, wherein the failure of one thread, tends to cause failure in the remaining threads, substantially reducing the pull-out strength of the nut or nut clip. Further, the thread in the integral folded strip nut clips disclosed in the prior art, is generally formed by splitting the metal surrounding the bore, further reducing the pull-out strength of the nut. The spaced folded nut clips of the prior art are relatively large to accommodate the necessary spacing between the folds, further limiting the application of the nut or nut clip.

The method of making a laminated nut clip of this invention solves the problem of forming a continuous female thread in the nut bore, while meeting the performance requirements for a conventional solid nut. Further, the method of making a laminated nut clip of this invention permits the use of a single strip, eliminating welding and staking operations, while meeting the performance requirements for this application.

SUMMARY OF THE INVENTION

The method of this invention may be utilized to form a laminated nut or integral nut clip, wherein the nut or nut portion comprises a plurality of lamina having a continuous female threaded bore. The lamina in the disclosed embodiment of the method is formed by spirally rolling a strip, with the strip end located within the spiral, then flattening the spirally rolled strip to form at least three interfolded, generally flat laminae with the end of the strip received within the fold of the adjacent outer lamina and retained therein. By this method, the laminae are securely retained in face-to-face relation at their opposed edges.

The preferred method of forming the threaded bore includes first piercing a circular hole with a piercing tool through one face of a plurality of generally flat lamina retained in face-to-face contact; then extruding an integral barrel portion in the laminae by forcing a punch through the pierced hole through the opposite face of the lamina; and, finally rolling a continuous spiral female thread in the pierced and extruded hole.

This method has many advantages over the methods disclosed in the prior art. First, extruding a barrel in the laminate wipes the burrs surrounding the pierced opening, eliminating the problem of stress cracking around the threaded opening. Second, the wiping action during extrusion holds the lamina during threading, similar to a "cold weld." This is particularly important to avoid spreading of the lamina during thread forming. Third, the extruded opening serves as a lead-in for the thread forming tool, avoiding cocking of the threading tool. Fourth, the extruded barrel results in a much stronger structure. As described above, the barrel is comprised of a plurality of continuous integral nested cone-shaped portions. Fifth, the rolling of the thread avoids burrs and thread chips which wear the thread forming tool and tend to spread the laminae. Further, the continuous spiral thread is substantially stronger than a discontinuous thread as described above. Finally, and most importantly, the nut and nut clip formed by the method of this invention meets all conventional performance requirements, including proof load, pull-out strength, etc.

Other advantages and meritorious features of the method of this invention will be more fully understood from the following description of the preferred embodiments, the appended claims and the drawings, a brief description of which follows.

BRIEF DESCRIPTION OF THE DRAWINGS

FIG. 7 illustrates the piercing of the interfolded nut portion shown in FIG. 6;

FIG. 8 is a top view of the strip after piercing as shown in FIG. 7;

FIG. 9 illustrates one method of extruding an integral barrel in the strip shown in FIG. 8;

FIG. 10 is a top view of the strip after extruding as shown in FIG. 9;

FIG. 11 illustrates one method of threading the bore of the nut strip shown in FIG. 10;

FIG. 12 is an elevated perspective view of a nut clip formed by the method shown in FIGS. 3 to 11; and FIG. 13 is a side cross-sectional view of the nut portion of the nut clip shown in FIG. 12.

DESCRIPTION OF THE PREFERRED METHOD

Figure 1:
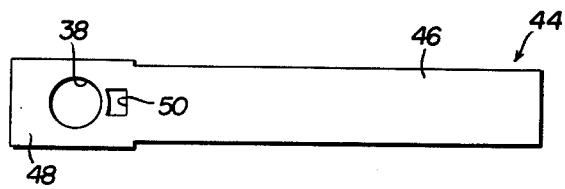
FIG. 1 is a top elevation of one embodiment of a strip which may be utilized to form an integral nut strip by the method of this invention.

The clip nut 20 shown in FIG. 12, which may be formed by the method of this invention, is more fully disclosed in a copending application assigned to the Assignee of this application, Ser. No. 497,812, filed Aug. 15, 1974, which application is incorporated herein by reference. The clip nut shown in FIG. 12 includes a nut portion 22 and an integral clip portion 24. As shown in FIG. 12, the clip portion comprises a plurality of interfolded lamina 28 having an integral barrel 30. As shown in FIG. 13, the barrel 30 is comprised of nested cone-shaped portions 32 formed in the lamina. The barrel portion 30 surrounds a threaded bore 34.

In the preferred embodiment of the nut clip, the clip portion 24 is integral with the nut portion and is U-shaped to extend beneath the barrel portion 30 of the nut portion. The clip portion in the disclosed embodiment includes an integrally struck tang portion 36 which extends toward the barrel portion to retain the nut clip on a panel or structural member prior to final securement. The tang portion 36 includes an aperture 38, coaxially aligned with the threaded bore 34 for receipt of a male threaded member, as more fully disclosed in the above referenced copending application. It will be understood that the nut portion 22 may be formed separately from the clip portion 24 or utilized as a nut in conventional applications. The preferred method of forming the nut clip shown in FIGS. 12 and 13 will now be described.

Figure 2:
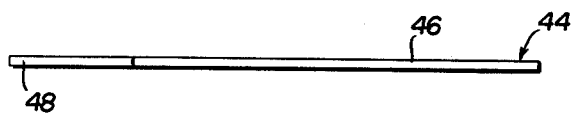
FIG. 2 is a side elevation of the strip shown in FIG. 1.
Figure 3:
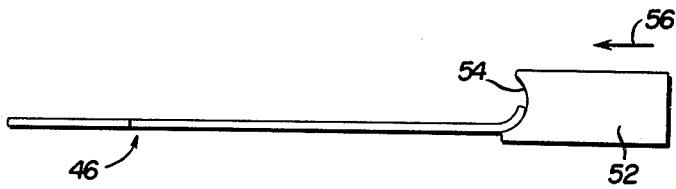
FIG. 3 illustrates the first step in forming the spirally folded nut portion utilized in the method of this invention.

As described, the nut clip may be formed from a continuous strip of sheet material, such as shown at 44 in FIGS. 1 and 2. The preferred embodiment of the nut clip is formed from a resilient sheet metal, such as stainless steel. The strip 44 may be stamped from a sheet of stainless steel, for example, by conventional methods. The strip 44 shown in FIGS. 1 and 2 includes a reduced width portion 46, which will form the nut portion and a part of the U-shaped clip portion, and an enlarged portion 48, which will form the clip portion including the integrally struck tang. The circular aperture 38 has been punched from the enlarged portion 48 and an opening 50 has been provided for the locking edge of the tang as described below.

Figure 4:
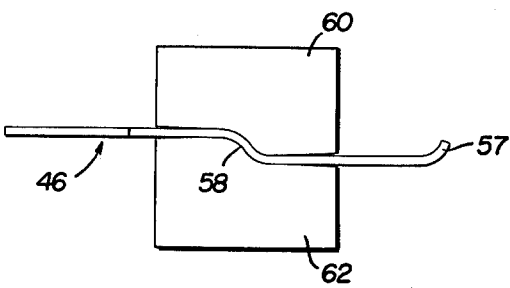
FIG. 4 illustrates a second step in the formation of the spirally folded nut portion begun in FIG. 3.
Figure 5:
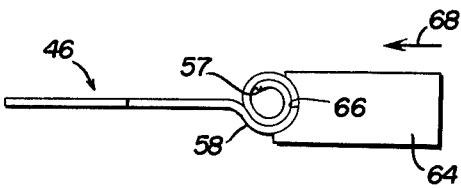
FIG. 5 illustrates one method of spirally rolling the end of the nut clip.
Figure 6:
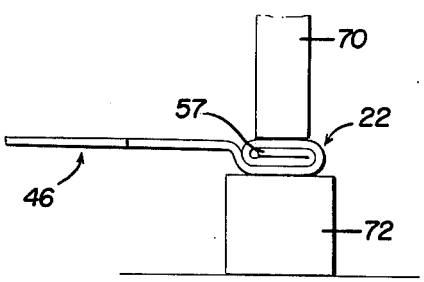
FIG. 6 illustrates one method of flattening the spiral roll shown in FIG. 5.

One suitable method for forming the spirally interfolded laminate of the nut portion is shown in FIGS. 3 to 6. First, the end of the strip is partially rolled by engaging the end of the strip with a die 52, having a generally cylindrical die face 54, in the direction of arrow 56. Next, as shown in FIG. 4, the mid-portion 58 of the strip is formed by matched dies 60 and 62 to define the junction between the nut portion and the clip portion. As shown in FIG. 5, the end of the strip is then spirally rolled upon itself to the mid-portion 58 by engaging the curled end portion of the strip 57 with a die 64 having a generally cylindrical die surface 66. The die is moved in the direction of arrow 68 and may be similar to die 52. It should be noted that the end of the strip 57 is spirally rolled upon itself with the end 57 within the spiral. Finally, as shown in FIG. 6, the spiral is flattened against die 72 by punch 70. The resultant configuration of the nut portion 22 is a continuous spirally interfolded and flattened laminate, wherein the end 57 of the strip is retained between the folds of the adjacent lamina.

The barrel portion 30, including the nested cone-shaped portions 32 and the threaded bore 34, as shown in FIGS. 12 and 13, may be formed in the laminae as shown in FIGS. 7 to 11. First, a hole is pierced through the laminae as shown in FIG. 7. The laminate is supported against a die 76 having an aperture 78. The hole is pierced by piercing tool 80 having an enlarged end 82 engaging the laminate and a cylindrical piercing end 84 which pierces the laminate as shown. As shown in FIG. 8, the nut portion 22 then includes a pierced aperture 86 having a diameter substantially equal to the piercing end 84 of the tool 80. It will be understood by those skilled in the art that the face 88 of the nut portion adjacent the pierced aperture 86 will have a ragged or burred edge surrounding the aperture 86. This edge may cause stress cracking of the nut portion unless removed.

The barrel 30 of the nut and the tang 36 of the clip portion may be formed as shown in FIG. 9. The barrel portion is formed by extrusion die 92 having an enlarged body portion 94 and a reduced diameter cylindrical die portion 96 preferably having a spherical end portion 98. The nut portion blank is supported on a die 100 having an opening 102. The diameter of the cylindrical opening 102 is greater than the diameter of the die portion 96 and includes an arcuate annular shoulder 104 which receives the barrel 30 as it is extruded into the opening 102. Movement of the die member 92, as shown by arrow 106, forces the die member 96 through the pierced hole 86 in the nut blank, extruding the laminae into the opening 102 and forming the cone-shaped portions 32 in the laminae as shown in FIG. 13. In the preferred embodiment of the method, the extruding die portion 96 is received through the pierced aperture 86, through face 88 in the nut blank, wiping the ragged or burred edge of the aperture and forming the barrel portion 30 of the nut. This method has reduced the problem of stress cracking around the barrel which was a problem in previous methods.

As shown in FIGS. 7 and 9, the barrel portion and nut bore are formed by first piercing the nut blank through one face of the blank and extruding the barrel and nut bore through the opposed face of the blank. The diameter of the extruding blank 96 must therefore be greater than the diameter of the piercing die 84. For example, a nut bore having a nominal diameter of 0.285 may be formed by first piercing the nut blank with a pierce 84 having a nominal diameter of 0.220. The extrusion die 96 would then have a diameter of 0.285. The diameter of the barrel 30 will depend upon the diameter of the die opening 102. In the example, a die opening of 0.365 inches would be satisfactory. In the preferred embodiment, the diameter of the extruded opening 108, see FIG. 10, would also be equal to the pitch diameter of the threaded bore, because the threads are preferably rolled in the bore as described below.

As shown in FIG. 9, the integrally struck tang 36 may be formed simultaneously with the barrel portion 30 of the nut blank. In FIG. 9, the enlarged portion 48 of the strip is simultaneously engaged by matched dies 112 and 114, striking the tang portion 36 from the strip. The nut clip blank shown in FIG. 10 then includes the nut portion 22 having an extruded bore 108 and a clip portion 24 including the integrally struck tang 36. The nut portion 22 is then folded over the clip portion by a conventional die, with the bore 108 generally coaxially aligned with the bore 38 in the clip portion as shown in FIG. 11.

Finally, the bore 108 is threaded as shown in FIG. 11. As described, the thread forming tool 120 is preferably a thread rolling tool having a male threaded portion 122 which rolls rather than cuts a female thread in the bore 108. The thread rolling tool 122 is received through the aperture 38 in the tang 36 and then into the bore 108, rolling a thread 34 in the nut bore. As shown in FIG. 13, the cone-shaped portions provide a lead-in for the thread rolling tool. Further, in the preferred embodiment of the method of this invention, the extrusion of the aperture 108 and the cone-shaped configuration retain the laminae in face-to-face contact during the threading operation. As described, this has been a particular problem in forming a continuous female thread in a laminated structure. It will be noted from FIG. 10, that the thickness of the strip may be choosen such that the crest 124 of each thread is substantially defined on one lamina, permitting the lamina to individually and resiliently flex during torquing of the bolt or male threaded fastener used in the final assembly. This feature has been more fully disclosed in the above referenced copending application for United States patent which discloses and claims the preferred embodiment of the nut and nut clip.

As described above, the nut clip formed by the method of this invention has several advantages over the laminated nuts and nut clips disclosed in the prior art. The nested cone configuration of the barrel 30 is stronger than the spaced flat or arched shaped folded nut or nut clips shown in the prior art, reducing the required number of laminae for the nut portion and resulting in a lower profile. The full female spiral thread meets the performance requirements for a solid nut, which is not true of the prior art laminated nuts and nut clips. Further, the barrel is less subject to stress cracking because the ragged pierced edge has been eliminated and the barrel shown in FIG. 12 has a substantially flat barrel end 126, which is stronger than the spiral or configured opening used in the commercial folded nut clips. The cone-shaped opening to the threaded bore 34 also provides a lead-in for the bolt in final assembly which is received through the aperture 38 in the tang 36 and into the threaded bore 34 in the direction of the thread forming tool 120 shown in FIG. 11. Upon receipt of the bolt, as described in the above referenced copending application for United States patent, the laminated nut portion will function as an integral nut. During final torquing of the bolt, however, the cone-shaped laminae 32 will individually and resiliently flex into the root of the male threaded bolt, providing an anti-backoff feature which is not true of the nuts and nut clips shown in the prior art.

It will be understood that the disclosed method may be utilized to form a laminated nut or an integral laminated nut clip as shown in FIG. 12. Further, the method of forming a continuous female thread shown in FIGS. 7, 9 and 11 may be utilized in laminated structures other than the spirally interfolded nut portion shown in FIG. 13.

I claim:

1. A method of forming a nut, comprising the steps of:
   a. piercing a circular hole through a plurality of generally flat laminae retained in face-to-face contact, with a piercing tool disposed from one side face of said laminae forming generally ragged edges on the opposite face of said laminae,
   b. extruding an integral barrel portion in said laminae by disposing a cylindrical punch through said pierced hole from opposite said one laminae side face, thereby extruding the ragged pierced laminae edges into said barrel portion, said punch having a diameter greater than the diameter of said pierced circular hole and forming a barrel end extending from said one side face of the laminae with each lamina having a conical portion nested within said barrel portion; and
   c. forming a continuous female spiral thread in said pierced laminae hole on the edges of said laminae surrounding said hole through said opposite side face of said laminae.

2. The method defined in claim 1, wherein said continuous female thread is formed by inserting a thread rolling tool into said opposite laminae side face, using said laminae conical portions as a lead-in and avoiding cutting chips within the barrel portion.

3. The method as defined in claim 1, wherein said laminae are formed by the steps of:
   a. spirally rolling the end of a continuous strip of resilient sheet material into a hollow tubular form, and
   b. flattening the spirally rolled portion of said strip to form continuous interfolded laminae, in face-to-face contact, with the end of the strip received within the fold of the adjacent laminae.

4. The method of making a nut from a continuous strip of resilient sheet metal, including the steps of:
   a. spirally rolling said strip in a hollow tubular form with the strip end located within the spiral and the outer strip face in face-to-face contact with the inner face of the adjacent outer spiral,
   b. flattening the spirally rolled strip to form at least three interfolded, generally flat laminae with the end of the strip received within the fold of the adjacent outer laminae and retained therein, and c. forming a threaded bore through said laminae having a continuous female thread, the pitch of said thread being approximately equal to the thickness of said strip formed on the edges of said laminae.

5. The method defined in claim 4, wherein a barrel portion is formed in said laminae by the steps of:
   a. piercing a circular hole through one face of said spirally rolled and flattened laminae, and
   b. extruding said barrel portion through the opposed face of said laminae by forcing a cylindrical punch having a diameter greater than the diameter of said pierced hole, through said pierced hole.

6. The method defined in claim 5, wherein said laminae are supported on a die having a cylindrical opening greater than the diameter of said cylindrical punch during the extrusion step.

7. The method defined in claim 5, wherein a continuous spiral female thread is formed in said pierced hole, by rolling.

8. The method of claim 4, including the step of folding the free end of said strip beneath said barrel portion, forming an integral U-shaped clip portion.

9. The method of forming a nut from a continuous strip of resilient metal, comprising the steps of, in sequence:
   a. spirally rolling said strip with one end within the spiral,
   b. flatting the rolled spiral strip into at least three interfolded, relatively flat laminae,
   c. piercing a circular hole through one face of said laminae,
   d. supporting the laminae on a die having a cylindrical opening greater in diameter than said pierced hole, coaxially aligned with said hole,
   e. forcing a cylindrical punch through the opposed laminae face and the pierced hole in the laminae and into the die opening, said punch having a diameter greater than the pierced laminae hole and less than the die opening, thereby extruding an integral barrel portion in said laminae having an end porjecting into the die opening and each laminae having a cone-shaped portion surrounding the pierced hole and projecting toward said barrel end, f. forming a female thread in said pierced hole through said opposed laminae face, on the edges of said laminae.

10. The method defined in claim 9, wherein said thread is formed by disposing a thread rolling tool into said pierced hole, through said outer face of the opposite laminae, said cone-shaped portions providing a lead-in angle for threading and said laminae temporarily retained in face-to-face contact by the extrusion step, forming a continuous female thread in said hole.

11. The method defined in claim 9, including the additional step of folded the free end of said laminae beneath said barrel portion, forming an integral U-shaped clip portion.

* * * * *